United States Patent
Herbers et al.

(10) Patent No.: US 6,857,859 B2
(45) Date of Patent: Feb. 22, 2005

(54) GASKET FOR JET PUMP ASSEMBLY OF A FUEL SUPPLY UNIT

(75) Inventors: Christian Herbers, Utica, MI (US); Brian J. Pike, Oxford, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 96 days.

(21) Appl. No.: 10/370,384

(22) Filed: Feb. 19, 2003

(65) Prior Publication Data

US 2004/0161342 A1 Aug. 19, 2004

(51) Int. Cl.[7] .............................................. F04B 23/08
(52) U.S. Cl. ............................ 417/87; 417/88; 417/89; 417/86; 417/84; 417/423.3; 137/565.22; 137/565.23; 137/565.17
(58) Field of Search .............................. 417/86, 79, 80, 417/84, 423.3, 87, 88, 89; 137/565.22, 565.23, 565.17

(56) References Cited

U.S. PATENT DOCUMENTS

| | | | | |
|---|---|---|---|---|
| 655,479 A | * | 8/1900 | Mont et al. ............... | 294/68.22 |
| 2,664,823 A | | 1/1954 | Steenrod | |
| 3,294,025 A | * | 12/1966 | Niemeyer et al. ........ | 210/416.4 |
| 3,418,991 A | * | 12/1968 | Gelenius et al. ......... | 123/179.1 |
| 3,659,965 A | * | 5/1972 | Ebert et al. ............... | 417/363 |
| 3,748,066 A | * | 7/1973 | Sully et al. ............... | 417/423.3 |
| 4,694,857 A | * | 9/1987 | Harris .................... | 137/565.24 |
| 4,718,835 A | | 1/1988 | Maruyama | |
| 4,747,388 A | | 5/1988 | Tuckey ....................... | 123/514 |
| 4,860,714 A | | 8/1989 | Bucci ......................... | 123/514 |
| 4,878,518 A | | 11/1989 | Tuckey | |
| 4,924,908 A | | 5/1990 | Weiland et al. | |
| 4,988,389 A | | 1/1991 | Adamache et al. | |
| 5,133,324 A | * | 7/1992 | Michiaki ................... | 123/514 |
| 5,218,942 A | * | 6/1993 | Coha et al. ............... | 123/514 |
| 5,330,475 A | | 7/1994 | Woodward et al. ........... | 417/89 |
| 5,651,664 A | | 7/1997 | Hinds et al. | |
| 5,702,237 A | * | 12/1997 | Hill ........................... | 417/313 |
| 6,098,600 A | * | 8/2000 | Umetsu et al. ............. | 123/514 |
| 6,168,168 B1 | | 1/2001 | Brown | |
| 6,260,543 B1 | * | 7/2001 | Chih ......................... | 123/509 |
| 6,328,063 B1 | | 12/2001 | Tistchenko | |
| 6,371,153 B1 | | 4/2002 | Fischerkeller et al. | |
| 6,413,064 B1 | | 7/2002 | Parsch et al. | |
| 6,457,945 B2 | | 10/2002 | Kleppner et al. | |
| 6,502,558 B1 | | 1/2003 | Brunel ....................... | 123/509 |
| 2002/0096220 A1 | | 7/2002 | Iwamoto et al. | |
| 2002/0112700 A1 | | 8/2002 | Iwamoto et al. | |
| 2003/0000502 A1 | | 1/2003 | Jones et al. ................. | 123/509 |

FOREIGN PATENT DOCUMENTS

EP          1028018 A2     8/2000

OTHER PUBLICATIONS

International Search Report—PCT/US2004/001996—mailed Jun. 21, 2004 and Written Opinion of the International Searching Authority.

* cited by examiner

Primary Examiner—Justine R. Yu
Assistant Examiner—Emmanuel Sayoc

(57) ABSTRACT

A fuel supply unit 10 includes a fuel reservoir 22 for holding fuel, a fuel pump 18 within the reservoir for pumping fuel from the reservoir, a jet pump assembly 16 within the reservoir for drawing fuel from a fuel tank into the reservoir, and a gasket 24 operatively coupled with a portion of the jet pump assembly and disposed between the portion of the jet pump assembly and an interior surface of the reservoir so as to decouple the jet pump assembly from the reservoir.

10 Claims, 3 Drawing Sheets

GASKET FOR JET PUMP ASSEMBLY OF A FUEL SUPPLY UNIT

This application is based on U.S. Provisional Application No. 2002 P 01020 US, filed on Jan. 27, 2003, entitled "Gasket for Jet Pump Assembly of a Fuel Supply Unit", and claims the benefit thereof for priority purposes.

FIELD OF THE INVENTION

The invention relates to fuel supply units for automobile vehicles and more particularly, to a jet pump assembly of a fuel supply unit that includes a gasket to reduce noise in a fuel tank and allow for tolerance stack variations.

BACKGROUND OF THE INVENTION

One type of a conventional fuel pump unit for supplying fuel in a vehicle includes a fuel pump disposed within a swirl pot or fuel reservoir. The reservoir is disposed near a bottom of a fuel tank. The fuel pump pumps fuel from the reservoir through a fuel filter to an engine. A pressure regulator is coupled to the filter housing and returns excess fuel to the reservoir. The fuel pump also operates a jet pump assembly that draws fuel into the reservoir to ensure that the reservoir is replenished with fuel. A portion of the jet pump assembly is typically in plastic-to-plastic contact with the bottom of the reservoir that transmits noise when the jet pump assembly is operating to replenish the reservoir with fuel.

Accordingly, there is a need to decoupled the jet pump assembly from the reservoir to reduce noise of the fuel pump unit.

SUMMARY OF THE INVENTION

An object of the invention is to fulfill the need referred to above. In accordance with the principles of the present invention, this objective is achieved by providing a fuel supply unit including a fuel reservoir for holding fuel, a fuel pump within the reservoir for drawing fuel from a fuel tank into the reservoir, and a gasket operatively coupled with a portion of the jet pump assembly and disposed between the portion of the jet pump assembly and an interior surface of the reservoir so as to decouple the jet pump assembly from the reservoir.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
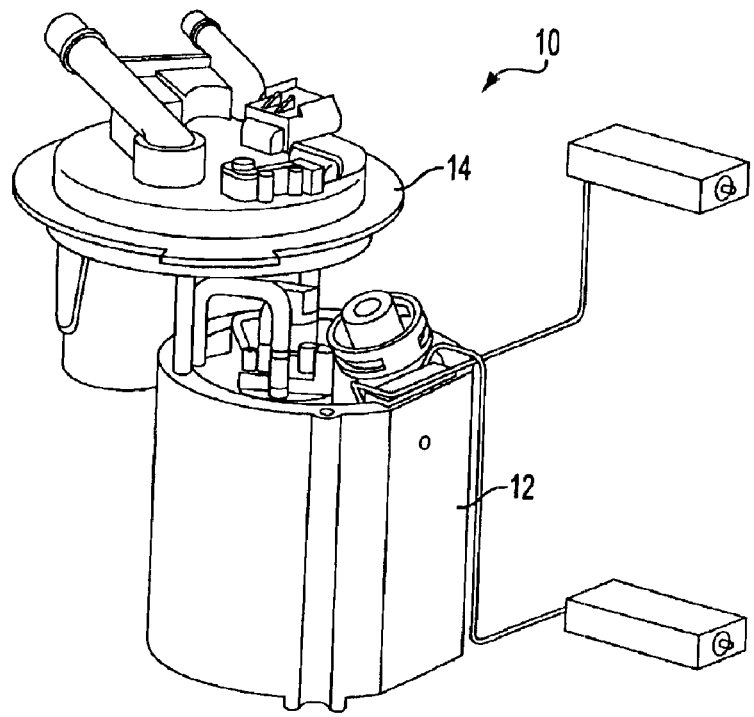
FIG. 1 is a perspective view of a fuel supply unit having a jet pump assembly provided in accordance with the principles of the present invention.

With reference to FIG. 1, a fuel supply unit, provided in accordance with the invention, is shown generally indicated at 10. The unit includes a fuel pump and reservoir assembly 12 and a filter/regulator assembly 14 that receives fuel supplied by the assembly 12 and delivers the fuel to an engine.

Figure 2:
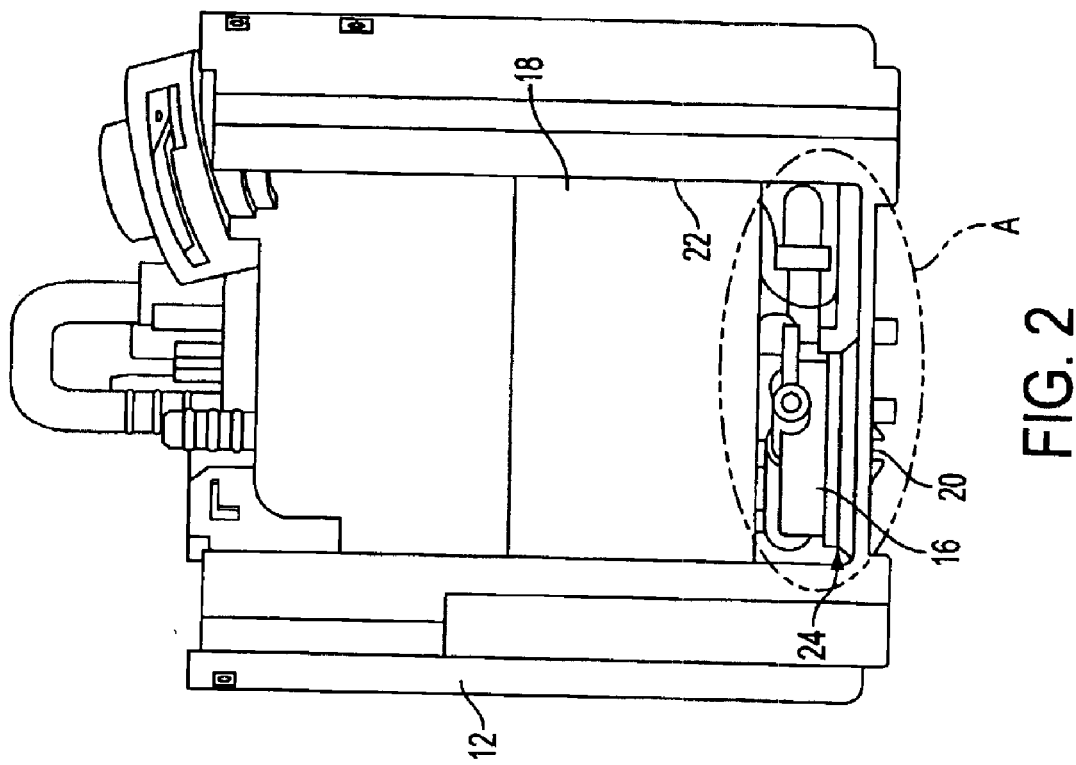
FIG. 2 is a cutaway perspective view of the fuel pump and reservoir assembly of the unit of FIG. 1, showing a gasket of the invention decoupling a portion of the jet pump assembly from a bottom of a reservoir.
Figure 4:
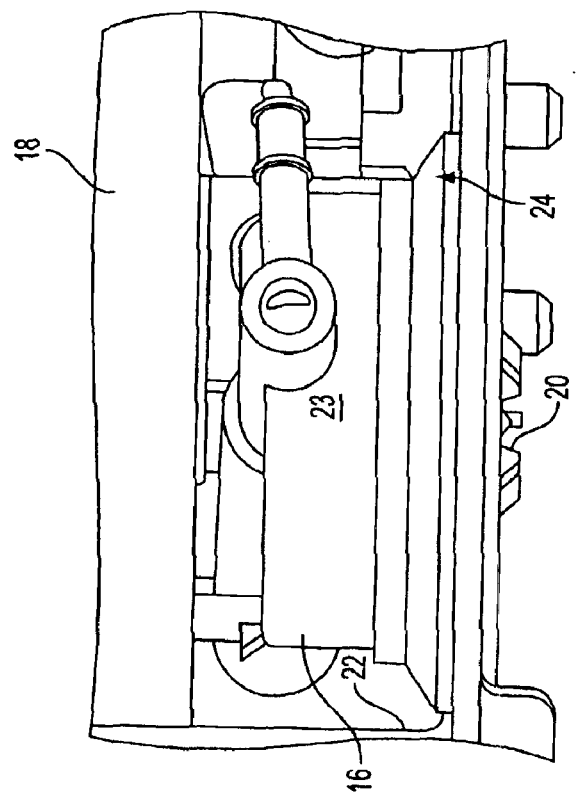
FIG. 4 is an enlarged view of the encircled portion A in FIG. 2.

As shown in FIGS. 2 and 4, assembly 12 includes a fuel pump 18 and conventional jet pump assembly 16 configured to draw fuel from a fuel tank (not shown) through an opening 20 of the reservoir 22 to replenish fuel in the reservoir so as to be pumped to an engine (not shown).

Figure 5:
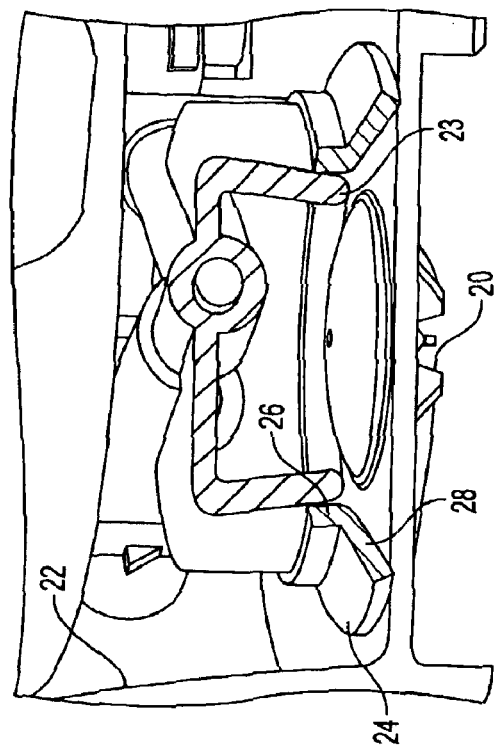
FIG. 5 is a partial cutaway view of FIG. 4.

As best shown in FIGS. 4 and 5, in accordance with the invention, a gasket 24 is provided between a portion 23 of the jet pump 16 and the bottom of the reservoir 22 so as to decouple the jet pump 16 from the reservoir 22. In the embodiment, the gasket 24 is preferably an elastomer and has a generally cylindrical engaging portion 26 constructed and arranged to frictionally engage an outer periphery of the generally cylindrical jet pump portion 23. An annular flange 28 extends from the engaging portion 26 and contacts the bottom of the reservoir 22.

Figure 6A:
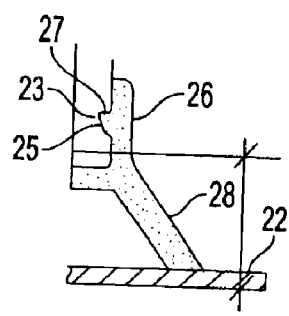
FIGS. 6a–6d show various cross-sections of gaskets of the invention.
Figure 6B:
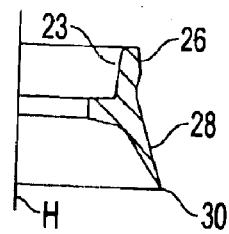
Figure 6C:
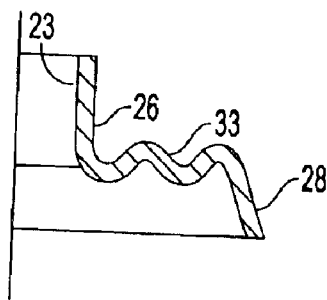
Figure 6D:
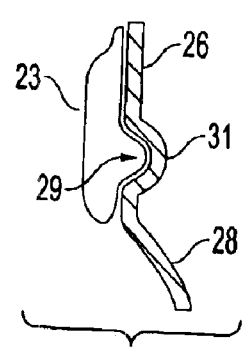
Figure 3:
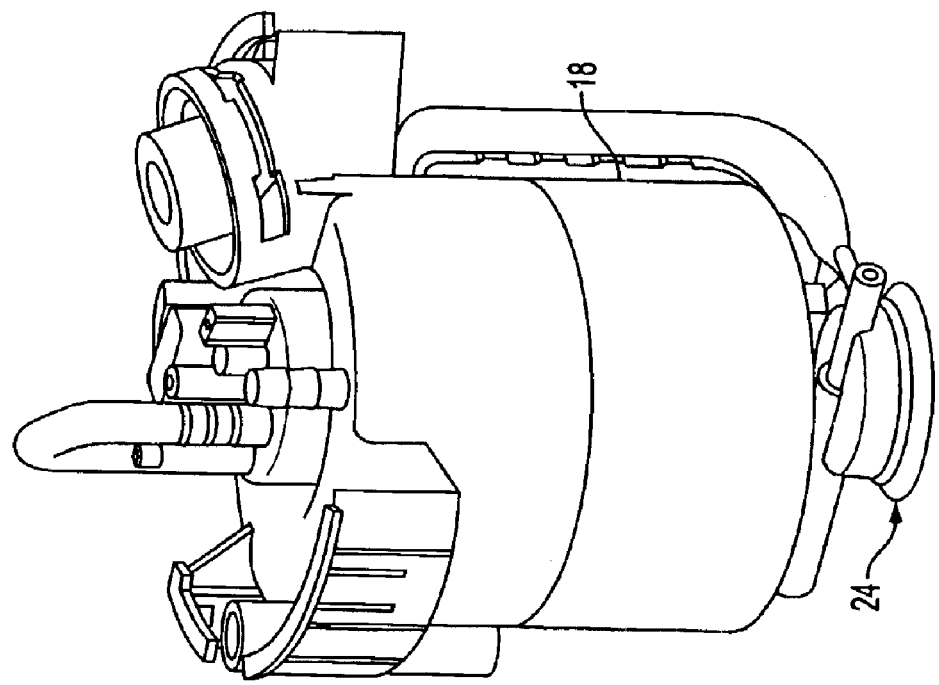
FIG. 3 is a perspective view of the fuel pump of FIG. 2 shown with the gasket provided on a portion of the jet pump assembly.

FIGS. 6a–6d show various configurations of the gasket 24. As shown in FIGS. 6a and 6d, the gasket 24 can include a mating structure constructed and arranged to mate with a cooperating structure of the jet pump portion 23. For example, FIG. 6a shows a detent 25 as the cooperating structure in the jet pump portion with the mating structure of the gasket including a protrusion 27 engaging the detent 25. Alternatively, as shown in FIG. 6d, the cooperating portion of the jet pump portion can include a protrusion 29 with the mating structure of the gasket being a detent 31 engaged by the protrusion 29. FIG. 6b shows an edge of the flange 28 of the gasket coming to a point 30 in cross-section, and FIG. 6c shows a gasket having a wave-like portion 33.

The gasket 24 is of a material that can be exposed to fuel, such as VITON®. Thus, the gasket 24 mechanically decouples the jet pump 16 from the bottom of the reservoir 22 to aid in noise reduction when the jet pump operates. The flange 28 of the gasket 24 seals to the bottom of the reservoir 22 allowing suction of fuel directly from the fuel tank. The gasket 24 also allows for tolerance stack variations.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A fuel supply unit comprising:

a fuel reservoir for holding fuel, a fuel pump within the reservoir for pumping fuel from the reservoir, a jet pump assembly within the reservoir for drawing fuel from a fuel tank into the reservoir, and a gasket operatively coupled with a portion of the jet pump assembly and disposed between the portion of the jet pump assembly and an interior surface of the reservoir so as to decouple the jet pump assembly from the reservoir, wherein an outer periphery of the portion of the jet pump assembly is generally cylindrical and the gasket has a generally cylindrical engaging portion frictionally engaging the outer periphery of the portion of the jet pump assembly.

2. The fuel supply unit of claim 1, wherein a flange extends from the engaging portion of the gasket and contacts an interior surface of the reservoir.

3. The fuel supply unit of claim 2, wherein the flange is annular and is constructed and arranged to create a seal with respect to the interior surface of the reservoir so that fuel can be drawn by the jet pump assembly directly from the fuel tank.

4. The fuel supply unit of claim 1, wherein the gasket includes a mating structure constructed and arranged to mate with a cooperating structure of the portion of the jet pump assembly.

5. The fuel supply unit of claim 4, wherein the cooperating structure includes a detent and the mating structure of the gasket includes a protrusion engaging the detent.

6. The fuel supply unit of claim 4, wherein the cooperating structure includes a protrusion and the mating structure includes a detent engaged by the protrusion.

7. The fuel supply unit of claim 1, wherein the gasket is an elastomer.

8. A fuel supply unit comprising:

a means for holding fuel, a means for pumping fuel from the means for holding fuel, a means for drawing fuel from a fuel tank into the means for holding fuel, and a means for decoupling operatively coupled with a portion of the means for drawing fuel and contacting a portion of the means for holding fuel, for mechanically decoupling the means for drawing fuel from the means for holding fuel, wherein the means for drawing fuel is a jet pump assembly and an outer periphery of the portion of the jet pump assembly is generally cylindrical and the means for decoupling is an elastomer casket having a generally cylindrical engaging portion frictionally engaging the outer periphery of the portion of the jet pump assembly.

9. The fuel supply unit of claim 8, wherein the means for holding fuel is a reservoir having an interior bottom surface, and wherein a flange extends from the engaging portion of the gasket and contacts an interior bottom surface of the reservoir.

10. The fuel supply unit of claim 9, wherein the flange is annular and is constructed and arranged to create a seal with respect to the interior bottom surface of the reservoir so that fuel can be drawn by the jet pump directly from the fuel tank.

* * * * *